United States Patent [19]
Davidson et al.

[11] Patent Number: 5,020,949
[45] Date of Patent: Jun. 4, 1991

[54] CONTROLLED-TORQUE FASTENER

[76] Inventors: Eugene P. Davidson; Alegra G. Davidson, both of Colebrook Stage, Winsted, Conn. 06098

[21] Appl. No.: 453,039
[22] Filed: Dec. 12, 1989

Related U.S. Application Data

[63] Continuation of Ser. No. 320,561, Mar. 8, 1989, abandoned.

[51] Int. Cl.⁵ .......................... F16B 3/00; F16B 33/04
[52] U.S. Cl. .......................................... 411/7; 411/11; 411/432; 411/3
[58] Field of Search ........................... 411/6, 7, 9–12, 411/231, 432, 3

[56] References Cited

U.S. PATENT DOCUMENTS

| | | | |
|---|---|---|---|
| 2,373,812 | 4/1945 | Coop | 411/6 |
| 2,634,650 | 4/1953 | Coop | 411/6 |
| 2,729,134 | 1/1956 | Stanton, Jr. et al. | 411/6 |
| 3,273,443 | 9/1966 | Rubin | 411/7 |
| 3,425,314 | 2/1969 | Ohlson | 411/7 |
| 4,176,582 | 12/1979 | Witte | 411/7 |
| 4,512,697 | 4/1985 | Cascini | 411/7 |

Primary Examiner—Neill R. Wilson
Attorney, Agent, or Firm—Victor E. Libert

[57] ABSTRACT

A controlled-torque fastener limits the torque which may be applied to it for the delivery (screwing-in) of the fastener into a threaded bore of a workpiece or the like. The fastener has a threaded shaft and a tool seat which is configured to be engaged by a driving tool such as a conventional wrench. The tool seat is movable between a driving position in which the tool seat is in driving engagement with the shaft and a non-driving position in which the tool seat effectively disengages the driving tool from driving engagement with the shaft. Resilient biasing means urge the tool seat into the driving position, and driving torque applied to the tool seat urges the tool seat against the biasing force towards the non-driving position. When the driving torque applied to the tool seat exceeds a pre-selected maximum torque, the biasing force is overcome, thereby disengaging the driving tool from effective driving engagement with the shaft, and discontinuing delivery of the fastener.

15 Claims, 4 Drawing Sheets

CONTROLLED-TORQUE FASTENER

This is a continuation of copending application Ser. No. 07/320,561 filed on Mar. 8, 1989, and now abandoned.

BACKGROUND OF THE INVENTION

1. Field Of The invention

The present invention is concerned with controlled-torque fastening devices, more particularly with threaded fasteners of the type which can be tightened only to a pre-determined torque level.

2. Description Of The Related Art

Controlled-torque fastening devices are well known in the art. For example, U.S. Pat. No. 3,667,339 discloses a controlled-torque fastening device comprising a threaded shaft fitted with a core member (9 in FIG. 1) about which a shell member (10) is shrink-fitted for frictional engagement therewith. The shell member is designed to be engaged by a driving tool which drives it and the core member in order to drive the fastener. When the driving torque applied to the shell member reaches a certain level, it overcomes frictional engagement between the core and shell members so that the shell member rotates freely about the core member, thereby effectively disengaging the driving tool from driving engagement with the fastener to prevent further tightening of the fastener.

Also well known in the art are controlled-torque threaded fasteners in which a component member of the device is ruptured or permanently deformed at a pre-determined torque level, in order to effectively disengage further application of torque to the fastener. For example, U.S. Pat. No. 3,929,054 discloses, in FIGS. 7–11 thereof, an embodiment of a threaded fastener in which the shaft has a boss 23' which is flared outwardly to retain a nut-like driving plate 19' in camming engagement with a base member 17' affixed to the shaft. The driving plate 19' and the base member 17' have matching serrated surfaces so that driving torque imposed upon the driving plate 19' drives the shaft until the torque reaches a pre-determined level, at which point the base member 17' cams the plate 19' upwardly to permanently deform, i.e., damage or destroy, the boss 23', thereby enabling the plate 19' to rotate freely about the threaded shaft. In FIGS. 1-6 of the patent, there is shown a threaded fastener in which the nut-like plate member 19 is splined to an extension portion of the shaft, the splines 25 fracturing (see FIG. 6) at a pre-determined torque level to effectively disengage the plate member from driving engagement with the shaft and prevent the imposition of further torque on the shaft.

U.S. Pat. No. 3,444,775 discloses a controlled-torque threaded fastener including a tightening nut formed with multiple torque-off collars which are broken off at pre-determined torque levels, thereby permitting staged tightening of bolts to pre-selected torque levels. U.S. Pat. No. 3,267,792 discloses a torque-limited hex nut utilizing a shear pin 34 which fractures when the pre-determined level of shear is reached, thereby allowing the outer portion of the nut to rotate about the inner portion and prevent further tightening. U.S. Pat. Nos. 3,812,757 and 4,029,379 also disclose bolts having a head or neck portion which is fractured at a pre-selected torque level to prevent further tightening.

SUMMARY OF THE INVENTION

In accordance with the present invention, there is provided a controlled-torque threaded fastener comprising the following components. A shaft has a threaded portion dimensioned and configured to threadably engage a complementary threaded bore. A tool seat is carried on the shaft and is dimensioned and configured to be engaged by a driving tool for rotating the tool seat, the tool seat being movable between (i) a driving position in which it is in driving engagement with the shaft, and (ii) a non-driving position in which the tool seat is out of driving engagement with one of the driving tool and the shaft, whereby the shaft is disengaged from driving engagement with the driving tool. Biasing means carried on the fastener are positioned to exert a pre-determined biasing force on the tool seat to urge the tool seat into its driving position in opposition to driving torque imposed on the tool seat by the driving tool. In this way, upon imposition on the tool seat of a driving torque which exceeds the biasing force, the biasing force is overcome and the imposed driving torque forces the tool seat into its non-driving position to terminate driving of the shaft by the driving tool.

Another aspect of the present invention provides a torque transmission means mounted on the shaft for rotation therewith and having a driven face against which the tool seat is urged by the biasing means, the driven face being dimensioned and configured to urge the tool seat against the biasing means in opposition to the biasing force.

In another aspect of the present invention, the torque transmission means comprises a driven collar, the tool seat comprises a driving nut which has a driving face and is mounted on the shaft for rotation thereabout, and the biasing means is mounted on the shaft to urge the driving face of the nut into driving engagement with the driven face of the collar. In this way, rotation of the driving nut drives the fastener until the driving torque imposed on the driving nut overcomes the biasing force.

Certain aspects of the invention provide for the collar driven face and the nut driving face to be complementary camming surfaces. For example, the collar driven face and the nut driving face may each be dimensioned and configured to provide a rachet-like engagement therebetween whereby the imposition of withdrawal torque on the driving nut maintains the driving nut in driving engagement with the driven collar.

In some aspects of the present invention, the biasing means comprises a plurality of circumferentially disposed leaf springs dimensioned and configured to define a tool seat comprising an opening bounded by the leaf springs. With this arrangement, driving torque imposed by a driving tool engaged with the tool acts against the leaf springs and, at a driving torque which overcomes the biasing force, forces the leaf springs radially outwardly of their initial circumferential orientation to terminate driving of the fastener by the driving tool. In this aspect of the invention, if it is desired to enable withdrawal of the fastener, the present invention optionally also provides for a back-off means comprising cinching means disposed circumferentially outwardly about the leaf springs and having a cinching seat dimensioned and configured to be drivingly engaged by a driving tool engaged with the tool seat. With this arrangement, withdrawal torque imposed by the driving tool upon the cinching seat tightens the cinching means about the leaf springs to draw the leaf springs against the driving tool to restore driving engagement between the shaft and the driving tool and thereby permit withdrawal of the fastener.

The leaf springs may be formed integrally with the bolt shaft, as by being cut from a hollow, flared head thereof, or may be fabricated from a separate piece, e.g., a cup-like piece, which is suitable affixed to the head end of the shaft.

Yet another embodiment of the invention provides for a fastener including a torque transmission means having therein a shaft detent formation forming at least part of a spline chamber and at least one spline member received within the spline chamber. In this aspect of the invention, the tool seat (which may comprise a driving nut of annular configuration) is mounted upon the fastener (e.g., upon an extension portion of the shaft) for rotation thereabout and has a tool seat detent formation formed therein. The shaft detent formation and the tool seat detent formation cooperate to define between them the spline chamber. The spline means is disposed within the spline chamber and is movable between (i) a first spline position in which the spline means connects the tool seat in driving engagement with the torque transmission means to thereby place the tool seat in its driving position, and (ii) a second spline position in which the spline means is recessed within one of the detent formations so as to free the driving nut for rotation about the extension portion of the shaft to thereby place the tool seat in its non-driving position. In this aspect of the invention, the biasing means is located within the spline chamber to urge the spline means into its first position in opposition to driving torque imposed upon the tool seat by the driving tool.

Other aspects and advantages of the invention will become apparent upon reading the following description. The fastener of the invention has a number of advantages over the prior art, including limitation of applied torque for delivery of the fastener, without permanently deforming any portion of the fastener, thereby leaving it intact for removal and re-use.

DETAILED DESCRIPTION OF THE INVENTION AND OF PREFERRED EMBODIMENTS THEREOF

Generally, the present invention provides a controlled-torque fastener which is re-usable, in that permanent deformation or rupture of a component part is not utilized to control the torque level but, rather, there is employed a biasing means which is temporarily deformed or compressed, or otherwise temporarily overcome at a pre-selected torque level to thereby limit the amount of applied torque at the pre-selected level. The biasing means either recovers after the imposed torque is removed or is restored by a "back-off" component as described below, in order to restore the fastener to operating condition. That is, the inherent elasticity or resiliency of the biasing means enables it to automatically recover, or at least substantially recover, its initial configuration, or means are provided to restore, or at least substantially restore, the initial configuration to enable re-use of the fastener.

Figure 1:
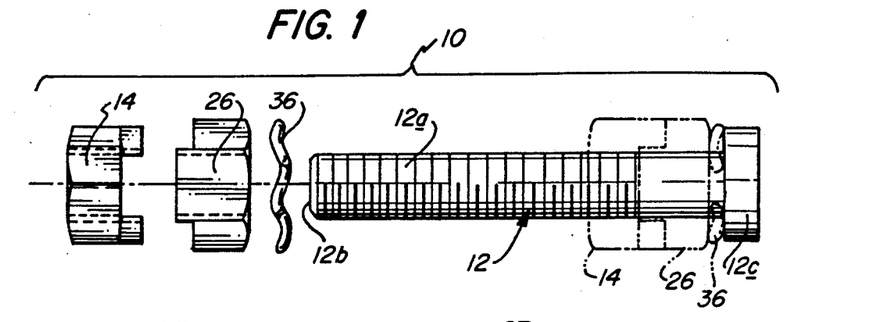
FIG. 1 is a schematic, exploded side view in elevation of a controlled-torque fastener comprising one embodiment of the present invention.

Referring now to FIG. 1, a controlled-torque fastener comprising one embodiment of the present invention is generally indicated at 10. Like the embodiments illustrated in the other Figures, the embodiment of FIG. 1 shows a right-handed tightening fastener but it will be appreciated that the invention is equally applicable to left-handed tightening fasteners. In any case, the fastener 10 comprises a shaft 12 having a threaded portion 12a which extends from the entry end 12b of shaft 12 and is threaded for engagement with a compatibly threaded bore. The end of shaft 12 opposite to entry end 12b terminates in a stop collar 12c which is of a diameter greater than the diameter of shaft 12. A torque transmission means comprises, in the illustrated embodiment, a driven collar 14 mounted on shaft 12 at the location shown in phantom outline in the exploded view of FIG. 1. Driven collar 14 is affixed to shaft 12 for rotation therewith by any suitable means, not shown, such as by one or more of being spot welded, or mechanically connected, or glued by a suitable adhesive, to shaft 12. For example, a radially extending pin may be extended through driven collar 14 to secure it to shaft 12. As shown in the perspective view of FIG. 1A, driven collar 14 is of generally annular configuration having a mounting bore 16 extending therethrough, and has a driven face 18 (FIG. 1A) and an opposite, flat face 18a (FIG. 1D). Driven face 18 has a pair of cam formations 20, 22 positioned radially opposite each other and separated by a pair of flat lands, 24a, 24b. Cam formations 20 and 22 each have respective ramp faces 20a and 22a and back faces 20b and 22b. Back faces 20b and 22b extend substantially perpendicularly from their associated lands 24a and 24b. This is illustrated in FIG. 1D with respect to back face 22b, wherein the angle b' is a right angle. On the other hand, ramp faces 20a and 22a extend at an obtuse angle from their associated lands 24a, 24b which is illustrated in FIG. 1D with respect to ramp face 22a, in which angle a' is an obtuse angle. Driven collar 14 has an extension surface of conventional hexagonal nut configuration which provides six flat faces or tool-engaging surfaces, three of which, 23a, 23b and 23c are visible in FIG. 1A.

A tool seat is provided in the illustrated embodiment by a driving nut 26 which, as shown in phantom outline in FIG. 1, is assembled between the driven collar 14 and stop collar 12c. As shown in FIG. 1B, driving nut 26 is, like driven collar 14, of substantially annular configuration having a central mounting bore 28 extending therethrough. Driving nut 26, like driven collar 14, has an exterior surface of conventional hexagonal nut configuration providing six substantially flat exterior faces which serve as tool-engaging surfaces, three of which tool-engaging surfaces, 26a, 26b and 26c, are visible in FIG. 1B. The configuration of the outer surface of driving nut 26 is shaped like a conventional hexagonal nut and is therefore readily adapted to be engaged by a suitable driving tool such as a socket head wrench or the jaws of a hex head or other conventional wrench or pliers. Any such conventional tools may be used for driving (screwing-in) and withdrawing (unscrewing) the fastener means, as described below.

Driving nut 26 has a driving face 27 and an opposite, flat face 27a (FIG. 1D). Driving face 27, like driven face 18 of driven collar 14, has a pair of cam formations 30, 32 radially spaced apart from each other and separated by flat lands 34a, 34b. Cam formations 30, 32 each have respective ramp faces 30a, 32a and respective back faces 30b, 32b. As is the case with the cam formations of driven collar 14, ramp faces 30a, 32a extend at an obtuse angle and back faces 30b, 32b extend substantially perpendicularly from lands 34a, 34b.

A biasing means to urge driving nut 26 into its driving position (described below) is provided in the embodiment of FIG. 1 by an annular, split wave-spring 36 (FIGS. 1 and 1C) which comprises a wave, i.e., serpentine, length of spring wire formed into a substantially circular configuration, the serpentine wire having a pre-selected spring strength to resist deformation forces which would tend to flatten the wave or serpentine configuration of the wire. The wave-spring 36 is shown in phantom outline in its assembled position in FIG. 1, between flat face 27a of driving nut 26 and stop collar 12c.

In order to assemble the controlled-torque fastener 10, the wave-spring 36 is fitted over shaft 12 from entry end 12b and placed in abutting contact with the interior face (unnumbered) of stop collar 12c. Driving nut 26 is then slipped over the shaft 12 from entry end 12b and the flat face 27a thereof is placed into abutting contact with wave-spring 36, so that cam formations 30, 32 are facing towards entry end 12b of shaft 12. Driven collar 14 is then placed onto shaft 12 from entry end 12b thereof with driven face 18 facing driving face 27 of driving nut 26. Driven collar 14 is advanced to engage driven face 18 thereof with driving face 27 of driving nut 26 so that cam formations 30, 32 of driving nut 26 will nest against lands 24a, 24b of driven collar 14, and cam formations 20, 22 of driven collar 14 will nest against land formations 34a, 34b of driving nut 26. The cam formations 30, 32 of driving nut 26 and the cam formations 20, 22 of driven collar 14 are dimensioned and configured to be congruent to each other so that driving nut 26 will mesh with driven collar 14 with the respective ramp and back faces in contact with each other. Driven collar 14 is advanced a sufficient distance along shaft 12 to engage but not flatten wave-spring 36, and driven collar 14 is then secured in place as by spot welding or the utilization of a mechanical fastener or suitable adhesive as described above, to provide the completed fastener.

The meshing of driving face 27 and driven face 18 is illustrated in schematic FIG. 1D which, for simplicity of illustration, omits cam formation 20 therefrom. Driven collar 14 has a driven face 18 and an opposite, flat face 18a. Cam formation 22, as previously described, is located between lands 24a and 24b and has a flat top surface 22'. As previously described, driving nut 26 has a driving face 27 and an opposite, flat face 27a. The three tool-engaging surfaces 26d, 26e and 26f which are not visible in FIG. 1B, are visible in FIG. 1D. Cam formations 30 and 32 have respective flat top surfaces 30' and 32'. As is evident from FIG. 1D, when driving face 27 is placed into abutting contact with driven face 18, with driving nut 26 and driven collar 14 coaxially aligned and radially oriented with respect to each other as illustrated in FIG. 1D, driving nut 26 will engage driven collar 14 in driving engagement, in the manner of two meshed gears. Driving face 27 of driving nut 26 and driven face 18 of driven collar 14 are thus seen to be congruent to each other, i.e., at corresponding surfaces meshed with each other. With a biasing force as indicated by the arrow B imposed on driving nut 26 by wavespring 36, driving nut 26 will remain meshed with driven collar 14, thereby driving driven collar 14 to rotate shaft 12 for driving (screwing-in) shaft 12 into a suitably threaded bore. As the fastener is tightened within a threaded bore, the increasing resistance to further driving in the rotational driving direction illustrated by the arrow D in FIG. 1D, requires increased driving torque, which urges driving nut 26 in the direction indicated by the arrow T in FIG. 1D, in opposition to the biasing force B. When the force T overcomes the force B, driving nut 26 is cammed or forced towards stop collar 12c into its non-driving position, in which it rotates more or less freely relative to driven collar 14 and about shaft 12. The tightening torque imposable upon fastener 10 is thus controlled or limited. Driving nut 26 may be further rotated, if necessary, in order to bring it back into the alignment illustrated in FIG. 1D and the driving tool may be disengaged therefrom. The biasing force B exerted by wave-spring 36 shifts driving nut 26 back into its driving position.

If it is desired to unscrew (withdraw) the fastener 10, any suitable driving tool may simply be engaged with driven collar 14 to impose a withdrawal torque on shaft 12, as indicated by the arrow W in FIg. 1D. However, withdrawal (unscrewing) may also be attained by engaging a suitable driving tool with driving nut 26. In fact, in some embodiments of the invention, the exterior surface of driven collar 14 may be of circular cylindrical configuration (as in the embodiment of FIG. 2) or otherwise configured to prevent engagement of it by conventional driving tools. In this way, if desired, the amount of withdrawal torque which can be applied to the fastener may also be limited.

Figure 1A:
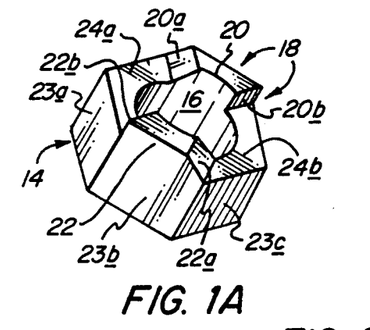
FIG. 1A is a perspective view of a torque transmission means component of the fastener of FIG. 1.
Figure 1B:
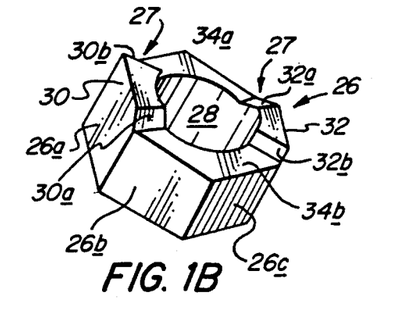
FIG. 1B is a perspective view of a tool seat component of the fastener of FIG. 1.
Figure 1C:
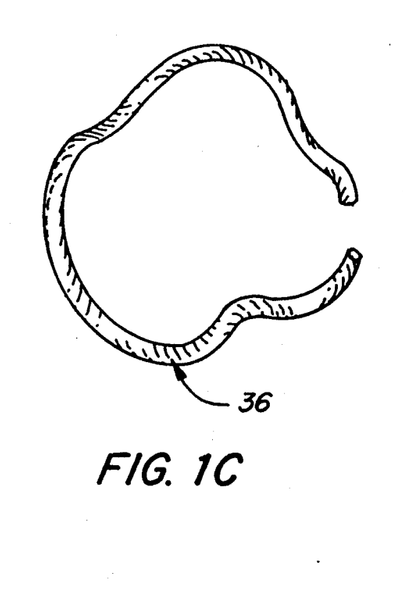
FIG. 1C is a perspective view of a biasing means component of the fastener of FIG. 1.
Figure 1D:
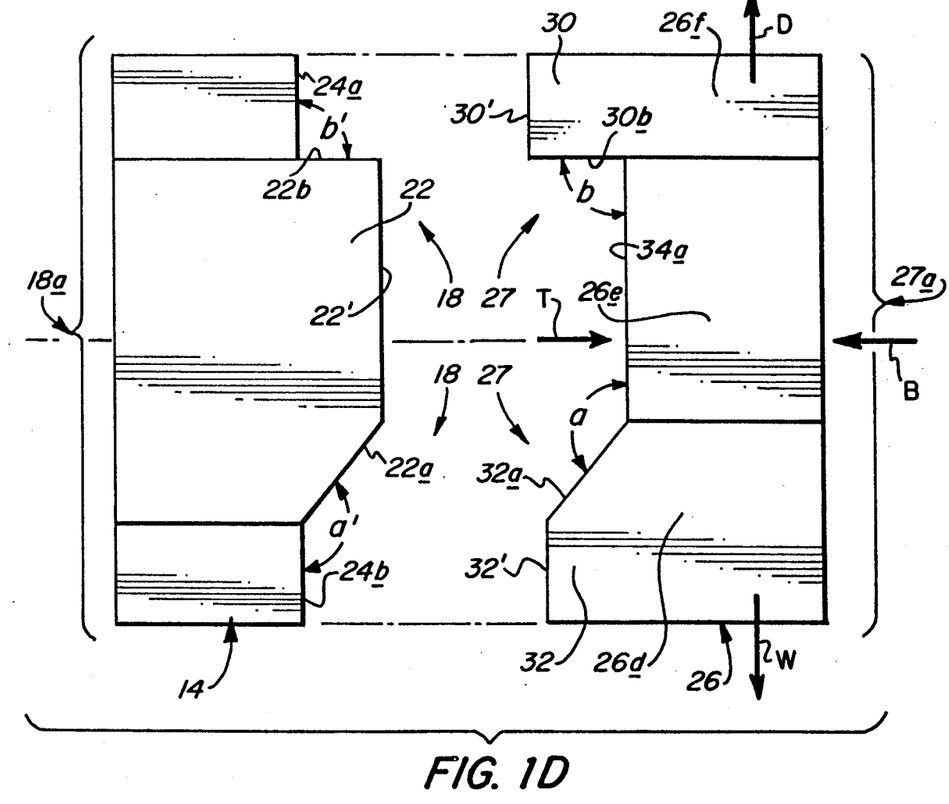
FIG. 1D is a schematic view showing the juxtaposition of driving and driven surfaces of, respectively, the tool seat component of FIG. 1B and the torque transmission means component of FIG. 1A.

In the embodiment of FIG. 1, any suitable driving tool may be engaged with driving nut 26 and rotated in a withdrawal direction (indicated by the rotational arrow W in FIG. 1D), in which case the engagement of back face 30b with back face 22b (and back face 32b in engagement with back face 20b, shown in FIGS. 1B and 1A but not shown in FIG. 1D) will provide meshing engagement between driving nut 26 and driven collar 14 to transmit withdrawal torque imposed by the driving tool to unscrew or withdraw the threaded fastener 10 from its threaded bore. Obtuse angle a (FIG. 1D) formed between land 34a and ramp face 32a is made equal to the obtuse angle a' formed between land 24b and ramp face 22a, and the angle b between back face 30b and land 34a is made equal to the angle b' between back face 22b and land 24a. In the illustrated embodiment, the angles b and b' are both 90° (right) angles, and the angles a and a' are both 120° angles. It will be apparent to those skilled in the art that the angles of one or both of the angle pairs a, a', and b, b' may be changed to provide different strengths of engagement between driving nut 26 and driven collar 14 for the application both of driving torque (to screw in the fastener) and withdrawal torque (to unscrew the fastener). Because the face angles of the ramp faces (e.g., angles a and a' of FIG. 1D) may differ from the face angles of the back faces (e.g., angles b and b' of FIG. 1D), a ratchet-like effect may be attained between the driving nut 26 and driven collar 14 in which the driving or tightening torque limit may be selected to be less than the withdrawal torque limit. Thus, with face angles a and a' of FIG. 1D being larger than face angles b and b' thereof, a withdrawal torque which is higher than the driving torque limit may be provided. This enables withdrawal (unscrewing) of the bolt even if, because of rusting or mechanical loads imposed on the fastener, the withdrawal torque is higher, at least initially, than the controlled driving torque limit of the fastener. Obviously, the ramp face angles and back face angles (as well as the magnitude of the biasing force exerted by the biasing means) may be selected at any desired values to provide desired torque characteristics. The ramp face angles and the back face angles may be equal to each other or they may differ. However, because a higher withdrawal torque is usually required to accommodate rusting or freezing of the bolt or the imposition of mechanical loads on it, usually, the ramp face angles will be greater than the back face angles. Generally, the ramp face angles (a and a' in FIG. 1D) are obtuse angles, for example, they will range from more than about 90° (e.g., about 91°) to about 135°. The back face angles (b and b' in FIG. 1D) are acute or right angles, for example, they will range from about 45° to about 90°. Generally, as used herein and in the claims, the ramp face(s) of the tool seat (driving nut) is/are the face(s) which face the direction of driving (screwing-in) movement of the driving nut, and the ramp face(s) of the torque transmission means (driven collar) is/are the face(s) which contact or mesh with the ramp face(s) of the tool seat. Conversely, the back face(s) of the tool seat is/are the face(s) which face the withdrawal direction of rotation of the tool seat, and the back face(s) of the torque transmission means is/are the face(s) which contact or mesh with the back face(s) of the tool seat. For example, in FIG. 1D, face 32a of driving nut 26 and face 22a of driven collar 14 are the ramp faces and back face 30b of driving nut 26 and back face 22b of driven collar 14 are the back faces. Reference to "face angles" means angles corresponding to those illustrated as a, a' and b, b' in FIG. 1D, that is, the term refers to the angle formed between the plane of a back face or a ramp face and the plane of the land separating the cam formations on which the faces are formed.

Although a pair of cam formations on each of the driving nut 26 and driven collar 14 provides satisfactory performance, it will be apparent to those skilled in the art that a greater number of such cam formations, e.g., three, four, five, or six, may be provided on each of the driving nut and driven collar, even to the extent of providing a quantity of such formations sufficient to effectively provide serrated driving and driven faces for, respectively, the driving nut and driven collar. However, regardless of the number of cam formations, the ramp faces and back faces will be formed at pre-selected face angles (corresponding to angles a, a' and b, b' in the illustrated embodiment) in order to provide the desired engaging strength for both driving and withdrawal torque engagement. It will further be apparent that in some applications, a single cam formation on each of the driving and driven faces may suffice. A limited number of cam formations, for example, from 1 to 12 per face, preferably from 1 to 6 pr face, e.g., from 2 to 6 per face, provides close control over camming forces between the tool seat (e.g., driving nut) and the torque transmission means (e.g., driven collar) and consequently over the pre-selected torque limits for both driving (screwing-in) and withdrawal (unscrewing).

The biasing means, wave-spring 36 in the embodiment of FIG. 1, is also designed to have a pre-selected compression strength. By appropriately designing the driving face 27 of the tool seat (driving nut 26) and the driven face 18 of the torque transmission means (driven collar 14), and selecting a biasing means of appropriate strength, the torque level at which the tool seat will be shifted to its non-driving position may be pre-selected to control the level of tightening torque attainable by fastener 10.

It will be appreciated by those skilled in the art that driving face 27 of driving nut 26 and driven face 18 of driven collar 14 could each be made flat and smooth so that only a frictional resistance would be provided to a relative rotation between them, and the strength of the biasing means provided by wave-spring 36 correspondingly increased to provide the desired pre-selected torque level at which driving nut 26 will be shifted from its driving position to its non-driving position. However, by providing a cammed, i.e., meshed, engagement between driving face 27 and driven face 18, the compression strength required of the biasing means (wave-spring 36) may be considerably lessened. This provides greater flexibility in design because two design factors, the driving and driven faces of the driving nut and driven collar, and the biasing force imposed by the biasing means, may be adjusted to determine the torque level of the fastener. Further, the pre-selected torque level may be largely determined by appropriate design of the driving and driven faces, a parameter which is easier to control to close tolerances than the compression strength of the biasing means. In addition, by relying on the camming resistance to relative movement between the tool seat (driving nut 26) and torque transmission means (driven collar 14) to provide much or most of the torque resistance, the imposition of unduly high compression forces on the biasing means, with the attendant danger of permanently deforming the biasing means, is avoided. Therefore, a biasing means of relatively modest compression strength may be utilized even when a high torque level is desired for the fastener.

Figure 2:
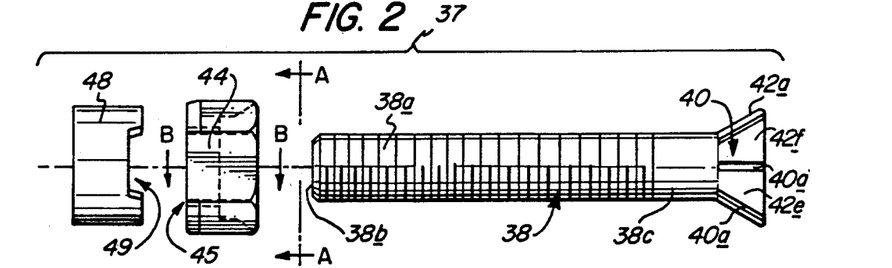
FIG. 2 is a schematic, exploded side view in elevation of a controlled-torque fastener comprising another embodiment of the present invention.
Figures 2A, 2B:
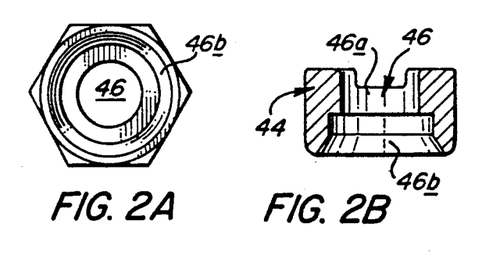
FIG. 2A is a plan view of a tool seat component of the fastener of FIG. 2, taken along line A—A of FIG. 2.
FIG. 2B is a cross-sectional view of the tool seat component of the fastener of FIG. 2, taken along line B—B of FIG. 2.
Figure 2C:
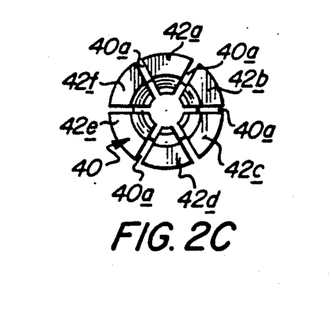
FIG. 2C is an end view of the biasing means end of the fastener of FIG. 2.

Referring now to FIG. 2, there is shown another embodiment of the invention in which the biasing means are integrally formed with the shaft. The controlled-torque fastener 37 of FIG. 2 comprises a shaft 38 having a threaded portion 38a which extends from the entry end 38b of shaft 38, stopping short of biasing means 40 to leave an unthreaded portion 38c of shaft 38. Biasing means 40, as seen in FIGS. 2 and 2C, is formed from an enlarged diameter portion of shaft 38 which is tapered to flare outwardly in a direction moving away from entry end 38b of shaft 38. The flared portion is notched by a plurality of longitudinal slits 40a equally radially spaced apart about the periphery of biasing means 40 to provide a plurality of finger-like springs 42a–42f (FIG. 2C) circumferentially disposed about the longitudinal axis of threaded shaft 38.

A tool seat is provided in this embodiment by a driving nut 44 which is similar in external configuration to driving nut 26 of the FIG. 1 embodiment, thereby providing a plurality of tool-engaging surfaces (unnumbered in the FIG. 2 embodiment) for applying driving torque to the tool seat. Driving nut 44 has a driving face 45 (FIG. 2) and, as best seen in FIG. 2B, a mounting bore 46 extending therethrough. Mounting bore 46 comprises a mounting portion 46a and a contact portion 46b which has a truncated conical configuration dimensioned and configured to engage the exterior surfaces of spring 42a–f, for purposes to be explained below. A torque transmission means is provided in this embodiment by a driven collar 48 having an exterior surface (unnumbered) of circular cylindrical configuration, and a driven face 49. Driven face 49 of driven collar 48 and driving face 45 of driving nut 44 are each dimensioned and configured to suitably engage each other in a manner as described in detail with respect to the embodiment of FIGS. 1–1B. Therefore, the configuration of driving face 45 and driven face 49 is not further described herein. Controlled-torque fastener 37; is assemble din a manner similar to that described above with the FIGS. 1–1B embodiment, in that driving nut 44 is fitted over shaft 38 from entry end 38b thereof and is moved along the shaft to place contact portion 46b of mounting bore 46 into contact with the exterior surfaces of springs 42a–f. Driven collar 48 is then similarly fitted over shaft 38 until driven face 49 suitably engages driving face 45, and driven collar 48 is then affixed to shaft 38 for rotation therewith, as by spot welding or the utilization of a suitable mechanical fastener or adhesive or a combination thereof.

The use of controlled-torque threaded fastener 37 is similar to that described above with respect to threaded fastener 10, in that a driving tool is used to engage driving nut 44 to drive threaded shaft 38 into a suitably threaded bore. As the resistance to further tightening increases, the driving torque increases to a level at which the camming action imposed on driving nut 44 by driven collar 48 overcomes the spring strength of springs 42a–f to radially compress spring 42a–f sufficiently that driving nut 44 disengages from driving engagement with driven collar 48 and is shifted to its non-driving position in which it rotates freely about shaft 38, thereby terminating further driving of fastener 37 at the pre-selected torque level.

The fastener 37 may be unscrewed from the threaded bore by reversing the direction of rotation of the driving tool to impose a withdrawal torque on driving nut 44. The ratchet-like engagement of driving face 45 of driving nut 44 with driven face 49 of driven collar 48 is maintained by biasing means 40 urging driving nut 44 into engagement with driven collar 48.

Figure 3:
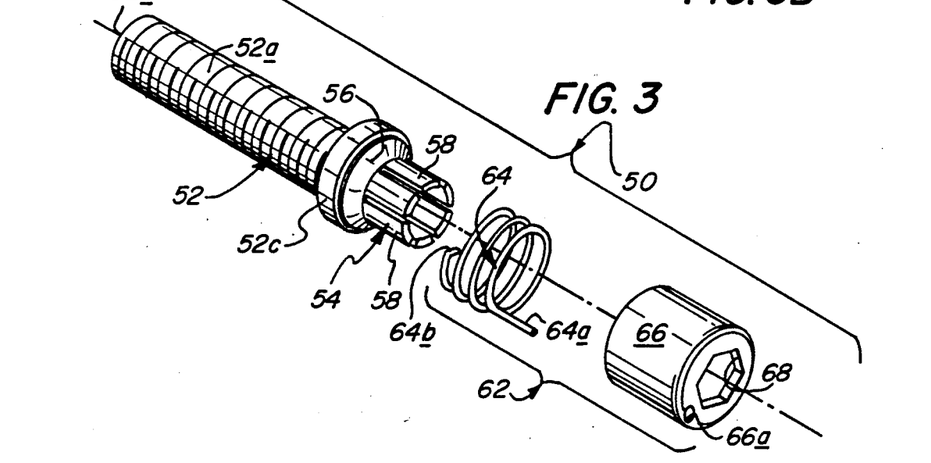
FIG. 3 is a schematic, exploded perspective view of a controlled-torque fastener comprising yet another embodiment of the present invention.
Figure 3A:
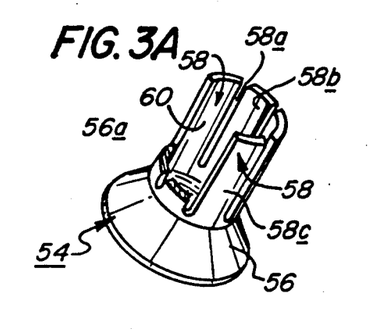
FIG. 3A is a perspective view of a cup-like spring member which comprises the biasing means and tool seat of the fastener of FIG. 3.
Figure 3B:
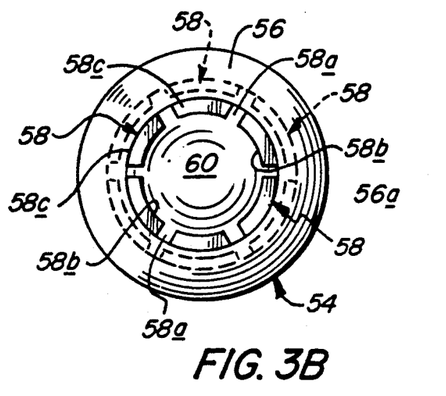
FIG. 3B is a top plan view of the member of FIG. 3A.
Figure 3C:
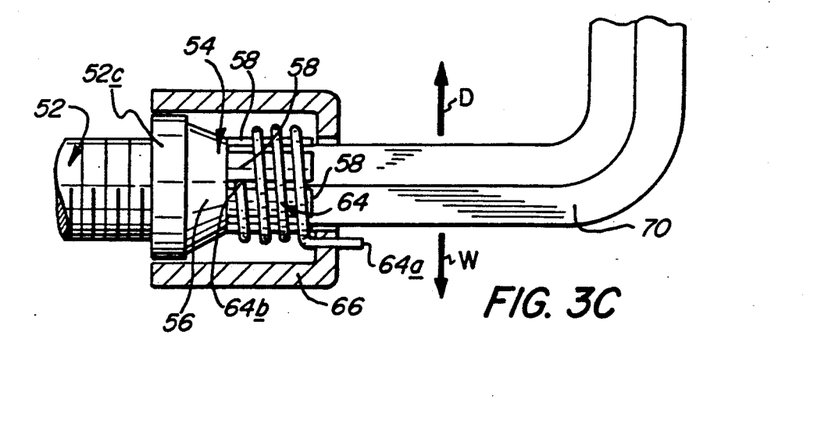
FIG. 3C is a partial side view in elevation of the fastener of FIG. 3, on a scale enlarged with respect to FIG. 3 and partly in cross section with parts broken away, showing a driving tool in engagement with the tool seat of the fastener of FIG. 3.

Referring now to FIGS. 3–3C, there is shown yet another embodiment of the invention comprising a socket-type fastener, that is, a fastener which is particularly well suited for installation and removal by using socket wrenches, sometimes referred to as Allen wrenches. In the illustrated embodiment, both the biasing means and the tool seat are provided by a plurality of leaf or finger-like springs extending longitudinally of the shaft. Thus, the controlled-torque fastener 50 of FIGS. 3–3C comprises a shaft 52 having a threaded portion 52a which extends from the entry end 52b of shaft 52, terminating at a stop collar 52c. On the side of stop collar 52c which is opposite shaft 52, there is affixed by any suitable means, such as by spot welding, a combination tool seat and biasing means comprising, in the illustrated embodiment, a cup 54 made of suitable spring steel and having a base 56, which is of truncated-cone configuration, and a plurality of finger-like springs 58 which extend from base 56. (Alternatively, the combination tool seat and biasing means could be formed integrally with the shaft, by being machined rom an extension portion thereof.) Springs 58 may readily be formed by cutting a plurality of slits 58a at radially equally spaced-apart distances from each other longitudinally of a hollow cylindrical extension projecting from base 56. As best seen in FIG. 3B, the interior of the biasing means provided by springs 58 cooperates with the crown 56a of base 56 to provide a tool seat 60 which extends from crown 56a within the cylindrical space about which springs 58 are circumferentially disposed. Crown 56a is dome-shaped so that it projects upwardly into the cylindrical space of tool seat 60 a distance which is sufficient to serve as a stand-off by holding the inserted end of a socket wrench (such as driving tool 70 of FIG. 3C) a distance away from the junctures of springs 58 with base 56, i.e., the base portions of springs 58. This spacing prevents or reduces the likelihood of driving tool 70 breaking or so badly deforming spring 58 that realignment of springs 58 by the cinching means, as described below, is impeded or prevented. Any suitable structure may be employed to provide a suitable stand-off. For example, instead of a dome shape of crown 56a, a pin or other similar structure could extend from base 56 the requisite distance into the cylindrical shaped volume of tool seat 60. Alternatively, the inside surface 58b of springs 58 could be undercut in the base portions of spring 58, to prevent the socket or Allen wrench from gaining gripping purchase at the base portions. However, this approach would weaken the springs 58 and for that reason the use of a stand-off is preferred.

Referring now to FIGS. 3 and 3A, a back-off means 62 comprises, in the illustrated embodiment a cinching means connected to a cinching seat. In the illustrated embodiment, the cinching means comprises a coil spring 64 and the cinching seat comprises an end cap 66 having formed therein a tool engaging formation 68 of hexagonal shape and dimensioned and configured to be drivingly engaged by a conventional Allen wrench such as Allen wrench 70, a part of which is shown in FIG. 3C. Coil spring 64 has an extension end 64a which is received within an opening 66a formed in end cap 66. The extension end 64a of coil spring 64 is bent or crimped so that it securely engages end cap 66 by being passed through the opening 66a thereof. The end of coil spring 64 opposite extension end 64a terminates in a seating end 64b which is crimped or bent, so that it can seat within one of the slits 58a between springs 58, as illustrated in FIG. 3C. If desired, a recess or other formation may be formed in cup 54 or elsewhere to engage and capture seating end 64b of spring 64. End cap 66 is rotatably mounted upon the peripheral shoulder of stop collar 52c by any suitable means, such as a groove and snap ring arrangement (not shown) to permit end cap 66 to rotate freely about stop collar 52c in either direction.

In use, a driving tool such as wrench 70 is inserted within tool engaging formation 68 and into tool seat 60 (FIG. 3B) so that the faces of the driving tool 70 engage the interior surfaces 58b of springs 58. With entry end 52b of shaft 52 fitted within a suitably threaded bore, driving tool 70 is rotated in the driving direction indicated by the arrow D in FIG. 3C to apply driving torque to the fastener 50. As the bolt is tightened in its threaded bore, the resistance increases and the increase in applied driving torque eventually overcomes the biasing strength of the springs 58, forcing at least some of them radially outwardly to the positions shown in phantom line outline in FIG. 3B. When this occurs, the driving tool 70 will rotate freely relative to the fastener 50 and is thereby disengaged from effective driving engagement with fastener 50. During the driving of the fastener, end cap 66 is also driven by driving tool 70; it and coil spring 64 freely rotate as a unit about springs 58, the pushing action on seating end 64b of coil spring 64 causing it to pass over the slits 58a between the springs 58.

Should it be desired to withdraw the controlled-torque fastener 50, the driving tool 70 is reinserted and this time rotated in the opposite, withdrawal direction indicated by the arrow W in FIG. 3C, causing end cap 66 to rotate about shaft 52. With this direction of rotation, the pulling or dragging action on the bent seating end 64b of spring 64 will cause it to snag in one of the slits 58a, thereby causing coil spring 64 to be tightened about springs 58 by continued rotation of end cap 66 in the withdrawal direction. Coil spring 64 thereby is cinched about the sprung springs 58 to draw them back into the tool-engaging position shown in solid line in FIG. 3B. This causes the end of the driving tool 70 to be drivingly engaged by tool seat 60, thereby permitting the imposition of withdrawal torque on shaft 52 in order to withdraw (unscrew) the fastener 50.

Figures 4, 4A, 4B:
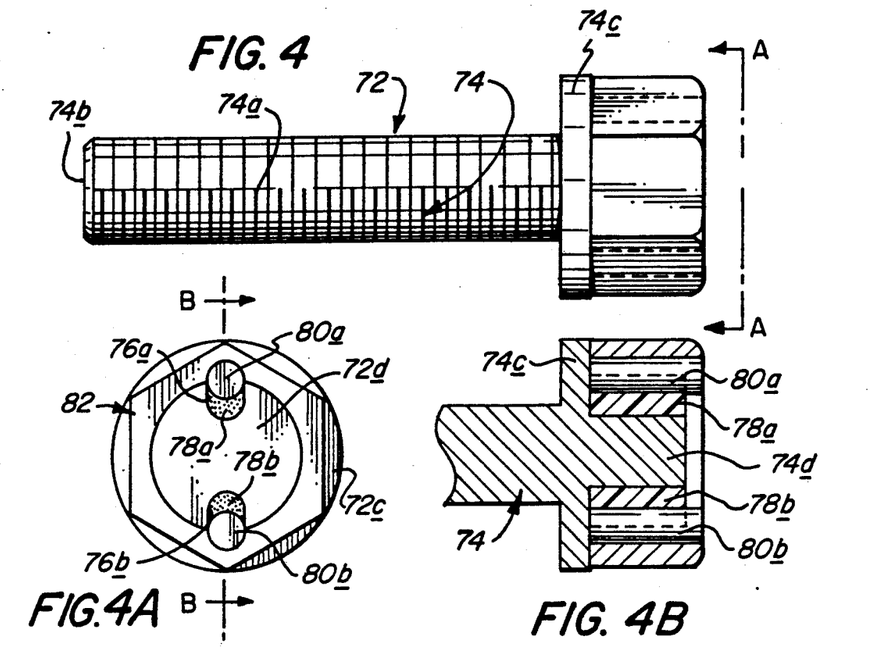
FIG. 4 is a schematic side view in elevation of a controlled-torque fastener comprising still another embodiment of the present invention.
FIG. 4A is an end view taken along line A—A of FIG. 4.
FIG. 4B is a section view taken along line B—B of FIG. 4A.
Figure 4C:
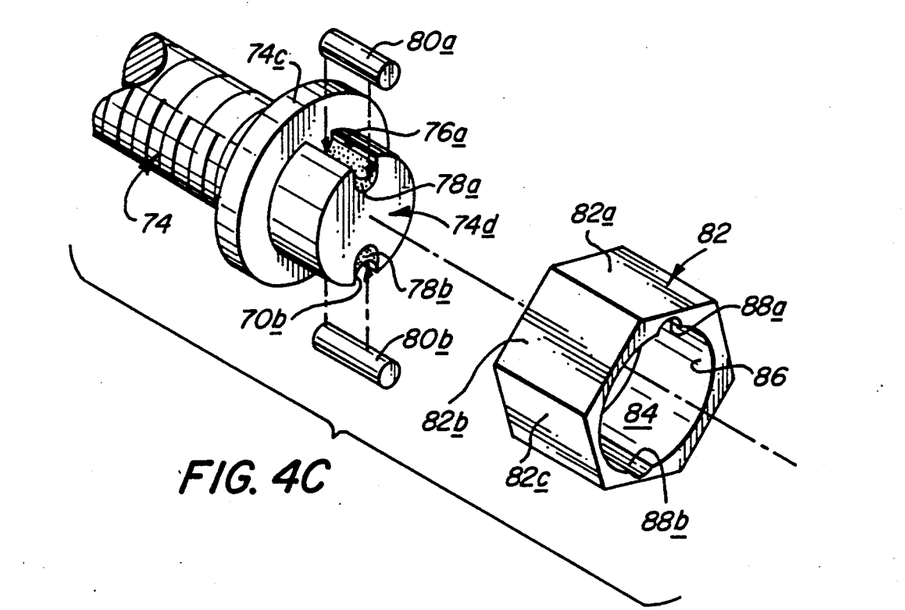
FIG. 4C is an exploded partial view in perspective of the fastener of FIG. 4.

Still another embodiment of the invention is shown in FIGS. 4–4C. In this embodiment, the torque transmission means is comprised of an extension portion 74d of the shaft and a pair of spline members comprised of pins 80a, 80b. Thus, in the illustrated embodiment, there is shown a controlled-torque fastener 72 comprising a shaft 74 having a threaded portion 74a extending between an entry end 74b and a stop collar 74c. Protruding from the side of stop collar 74c opposite to that from which shaft 74 extends, is an extension portion 74d of shaft 74 (FIGS. 4A–4C). As best seen in FIG. 4A, extension portion 74d has a shaft detent formation formed herein. In the illustrated embodiment, the shaft detent formation is provided by a pair of U-shaped recesses 76a, 76b formed on radially opposite sides of extension portion 74d and partially filled with a biasing means comprising, in the illustrated embodiment, elastomeric pads 78a, 78b. The biasing means can be any suitable means, such as springs or the like, as well as the illustrated elastomeric pads. These elastomeric pads may be suitably secured within U-shaped recesses 76a, 76b by any suitable means, such as an adhesive or by being formed in place by a material which cures and adheres to the surface of the recesses 76a, 76b. The recess surfaces may be suitably treated, either chemically or by forming grooves or other formations therein, to increase the adhesion strength between elastomeric pads 78a, 78b and the surfaces of the recesses 76a, 76b. A pair of splined members comprising, in the illustrated embodiment, a pair of connecting pins 80a, 80b are supported by elastomeric pads 78a, 78b so that they project partially outwardly of recesses 76a, 76b, as beset seen in FIG. 4A. For simplicity of illustration connecting pins 80a, 80b are shown as circular in cross section. However, as will be appreciated by those skilled in the art, they may desirably be made ovoid in cross section in order to reduce the tolerances otherwise necessary to insure sure retention of the pins 80a, 80b within spline chambers 76a/88a and 78b/88b (described below) and smooth depression of the elastomeric pads 78a, 78b by pins 80a, 80b upon attainment of the pre-selected torque level.

In the illustrated embodiment, the tool seat is provided by a driving nut 82 which has a mounting bore 84 extending longitudinally therethrough and defined by a cylindrical-shaped interior surface 86. Driving nut 82 has an exterior surface which is of conventional hexagonal nut shape to provide six tool engagement surfaces, three of which, 82a, 82b and 82c are fully visible in FIG. 4C. Any suitable means (not shown) such as a snap ring and groove arrangement may be used to retain driving nut 82 rotatably mounted upon extension portion 74d of shaft 74. Mounting bore 84 is dimensioned and configured to fit over the exterior, cylindrical shaped surface of extension portion 74d for rotation thereabout. A tool seat detent formation is provided in the illustrated embodiment by a pair of radially opposite U-shaped tool seat, i.e., driving nut, recesses 88a and 88b formed in driving nut 82, from the interior surface 86 thereof. Recesses 88a, 88b are initially radially aligned with recesses 76a, 76b to cooperate therewith to form a pair of spline chambers (76a/88a and 76b/88b) therebetween, within which chambers the spline members (pins 80a and 80b) are received. Each of the paired recesses is dimensioned and configured to receive a portion of connecting pins 80a, 80b therein, as illustrated in FIG. 4A.

With the arrangement as illustrated in FIG. 4A, driving nut 82 is maintained in its driving position by virtue of connecting pins 80a, 80b maintaining a driving engagement between driving nut 82 and, via extension portion 74d, with shaft 74.

In use, a suitable driving tool is engaged with the tool engagement surfaces 82a, 82b, etc., of driving nut 82, and driving torque is applied by rotating driving nut 82 in order to engage threaded portion 74a of shaft 74 with a suitably threaded bore. As the fastener 72 is tightened, increasing resistance to further driving increases the applied driving torque until the resistance provided by elastomeric pads 78a, 78b is overcome by the radially inward component of the driving torque imposed upon connecting pins 80a and 80b by driving nut 82. As the elastomeric pads 78a, 78b, are compressed and deformed by pins 80a and 80b, these are driven radially inwardly and clear recesses 88a, 88b. This releases driving nut 82 to rotate freely about extension portion 74d of shaft 74, thereby terminating the driving at a preselected torque level.

If a withdrawal torque greater than the controlled-torque level is necessary to withdraw the fastener 72, as may occur in the case of rusting, mechanical force applied to the bolt or the like, a modification to the design illustrated in FIGS. 4–4C may be employed. Thus, one or more additional sets of paired extension shaft and driving nut recesses (not shown) may be provided in which a suitable removable spline (not shown) may be inserted in order to provide a temporary conventional spline connection between driving nut 82 and extension portion 74d of shaft 74.

Generally, numerous variations may be made to the structure of the illustrated embodiments. For example, with respect to the embodiment of FIG. 2, driven collar 48 could be replaced with a plain stop collar and mounting bore 46 of driving nut 44 could be configured to cooperate with slits 40a of biasing means 40 to provide the mechanical equivalent of the meshing driving face 45 and driven face 49 of the embodiment illustrated in FIG. 2. In such an arrangement, the sides of the slits 40a could be machined to provide an appropriately angled face to mesh with other appropriately angled face formations formed within mounting bore 46 in contact portion 46b thereof. As suggested by the foregoing, it will be appreciated that while the invention has been described in detail with respect to certain specific preferred embodiments thereof, upon a reading and understanding of the foregoing, numerous other variations in design will occur to those skilled in the art. Such other variations are believed to lie within the scope and spirit of the invention and the appended claims.

What is claimed is:

1. A controlled-torque threaded fastener comprising:
   (a) a shaft having a threaded portion dimensioned and configured to threadably engage a complementary threaded bore;
   (b) a tool seat carried on the shaft and dimensioned and configured to be engaged by a driving tool for rotating the tool seat, the tool seat having a driving face and an opposing face and being movable between (i) a driving position in which it is in driving engagement with the shaft, and (ii) a non-driving position in which the tool seat is out of driving engagement with one of the driving tool and the shaft whereby the shaft is disengaged from driving engagement with the driving tool;
   (c) biasing means carried on the fastener and positioned to exert a pre-determined biasing force on the opposing face of the tool seat to urge the tool seat into its driving position in opposition to driving torque imposed on the tool seat by the driving tool whereby, upon imposition upon the tool seat of a driving torque which exceeds the biasing force, the biasing force is overcome and the imposed driving torque forces the tool seat into its non-driving position to terminate driving of the shaft by the driving tool; and
   (d) a torque transmission means mounted on the shaft for rotation therewith and having a driven face against which the driving face of the tool seat is urged by the biasing means, the driven face being dimensioned and configured to urge the tool seat against the biasing means in opposition to the biasing force.

2. The fastener of claim 1 wherein the torque transmission means comprises a driven collar, the tool seat comprises a driving nut having a driving face and mounted on the shaft for rotation thereabout, and the biasing means is mounted on the shaft to urge the driving face of the nut into driving engagement with the driven face of the collar whereby rotation of the driving nut drives the fastener until the driving torque imposed on the driving nut overcomes the biasing force.

3. The fastener of claim 2 wherein the collar driven face and the nut driving face are complementary camming surfaces.

4. The fastener of claim 2 wherein the collar driven face and the nut driving face are each dimensioned and configured to provide a rachet-like engagement therebetween whereby the imposition of withdrawal torque on the driving nut maintains the driving nut in driving engagement with the driven collar.

5. A controlled-torque threaded fastener comprising:
   (a) a shaft having a threaded portion dimensioned and configured to threadably engage a complementary threaded bore;
   (b) a tool seat carried on the shaft and dimensioned and configured to be engaged by a driving tool for rotating the tool seat, the tool seat being movable between (i) a driving position in which it is in driving engagement with the shaft, and (ii) a non-driving position in which the tool seat is out of driving engagement with one of the driving tool and the shaft whereby the shaft is disengaged from driving engagement with the driving tool;
   (c) biasing means carried on the fastener and positioned to exert a pre-determined biasing force on the tool seat to urge the tool seat into its driving position in opposition to driving torque imposed on the tool seat by the driving tool whereby, upon imposition upon the tool seat of a driving torque which exceeds the biasing force, the biasing force is overcome and the imposed driving torque forces the tool seat into its non-driving position to terminate driving of the shaft by the driving tool, wherein the biasing means comprises a plurality of circumferentially disposed leaf springs dimensioned and configured to define a tool seat comprising an opening bounded by the leaf springs, whereby driving torque imposed by a driving tool engaged with the tool acts against the leaf springs and, at a driving torque which overcomes the biasing force, forces the leaf springs radially outwardly of their initial circumferential orientation to terminate driving of the fastener by the driving tool; and
   (d) a back-off means comprising cinching means disposed circumferentially outwardly about the leaf springs and having a cinching seat dimensioned and configured to be drivingly engaged by a driving tool engaged with the tool seat, whereby withdrawal torque imposed by the driving tool upon the cinching seat tightens the cinching means about the leaf springs to draw the leaf springs against the driving tool to restore driving engagement between the shaft and the driving tool and thereby permit withdrawal of the fastener.

6. A controlled-torque threaded fastener comprising:
   (a) a shaft having a threaded portion dimensioned and configured to threadably engage a complementary threaded bore;

(b) a tool seat carried on the shaft and dimensioned and configured to be engaged by a driving tool for rotating the tool seat, the tool seat being movable between (i) a driving position in which it is in driving engagement with the shaft, and (ii) a non-driving position in which the tool seat is out of driving engagement with one of the driving tool and the shaft whereby the shaft is disengaged from driving engagement with the driving tool;

(c) biasing means carried on the fastener and positioned to exert a pre-determined biasing force on the tool set to urge the tool seat into its driving position in opposition to driving torque imposed on the tool seat by the driving tool whereby, upon imposition upon the tool seat of a driving torque which exceeds the biasing force, the biasing force is overcome and the imposed driving torque forces the tool seat into its non-driving position to terminate driving of the shaft by the driving tool; and (d) a torque transmission means having therein a shaft detent formation forming at least a part of a spline chamber and a longitudinal spline member received within the spline chamber, the longitudinal axis of the spline member being substantially parallel to the longitudinal axis of the shaft wherein the tool seat is mounted upon the fastener for rotation thereabout and has a tool seat detent formation formed therein, the shaft detent formation and the tool seat detent formation cooperating to define between them the spline chamber;

the spline member being disposed within the spline chamber and movable between (i) a first spline position in which the spline member connects the tool seat in driving engagement with the torque transmission means to thereby place the tool seat in its driving position, and (ii) a second spline position in which the spline member is recessed within one of the detent formations so as to free the driving nut for rotation about the extension portion of the shaft to thereby place the tool seat in its non-driving position; and the biasing means being located within the spline chamber to urge the spline member into its first position in opposition to driving torque imposed upon the tool seat by the driving tool.

7. The fastener of claim 6 wherein the torque transmission means comprises an extension portion of the shaft, the tool seat comprises a driving nut of annular configuration mounted upon the extension portion of the shaft for rotation thereabout.

8. The fastener of claim 7 wherein the driving nut has an inner surface which surmounts the outer surface of the extension portion of the shaft, the shaft detent formation being formed in the outer surface of the shaft and the tool seat detent formation being formed in the inner surface of the driving nut, and the driving torque urges the spline members in a radially inwardly direction against the biasing means.

9. A controlled-torque threaded fastener comprising:

(a) a shaft having a threaded portion dimensioned and configured to threadably engage a complementary threaded bore;

(b) a torque transmission means mounted on the shaft for rotation therewith;

(c) a tool seat carried on the shaft and dimensioned and configured to be engaged by a driving tool for rotating the tool seat, the tool seat being movable between (i) a driving position in which it is in driving engagement with the torque transmission means and, thereby, with the shaft, and (ii) a non-driving position in which the tool seat is out of driving engagement with the torque transmission means and, thereby, with the shaft; and (d) biasing means carried on the fastener and positioned to exert a pre-determined biasing force on the tool seat to urge the tool seat into its driving position in opposition to driving torque imposed on the tool seat by the driving tool whereby, upon imposition upon the tool seat of a driving torque which exceeds the biasing force, the biasing force is overcome and the imposed driving torque forces the tool seat into its non-driving position to terminate driving of the shaft by the driving tool.

10. The fastener of claim 9 wherein the tool seat comprises a driving nut having a driving face, the torque transmission means comprises a driven collar having a driven face, and the driving face and driven face are each dimensioned and configured to be in driving engagement with each other when the tool seat is in its driving position.

11. The fastener of claim 10 wherein the driven face and the driving face each have one or more congruent cam formations thereon.

12. A controlled-torque threaded fastener comprising:

(a) a shaft having a threaded portion dimensioned and configured to threadably engage a complementary threaded bore;

(b) a torque transmission means mounted on the shaft for rotation therewith;

(c) a tool seat carried on the shaft and dimensioned and configured to be engaged by a driving tool for rotating the tool seat, the tool seat being movable between (i) a driving position in which it is in driving engagement with the torque transmission means and, thereby, with the shaft, and (ii) a non-driving position in which the tool seat is out of driving engagement with the torque transmission means and, thereby, with the shaft; and (d) biasing means carried on the fastener and positioned to exert a pre-determined biasing force on the tool seat to urge the tool seat into its driving position in opposition to driving torque imposed on the tool seat by the driving tool whereby, upon imposition upon the tool seat of a driving torque which exceeds the biasing force, the biasing force is overcome and the imposed driving torque forces the tool seat into its non-driving position to terminate driving of the shaft by the driving tool, the tool seat comprising a driving nut having a driving face, the torque transmission means comprising a driven collar having a driven face, and the driving face and driven face each being dimensioned and configured to be in driving engagement with each other when the tool seat is in its driving position, the driven face and the driving face each having one or more congruent cam formations thereon, and the shaft having a longitudinal axis, the cam formations being separated by lands and having respective ramp faces and back faces, the ramp faces having a face angle of from about more than 90° to about 135 degrees relative to a plane intersecting the longitudinal axis and the back faces having a face angle of from about 45° to about 90 degrees relative to a plane intersecting the longitudinal axis.

13. A controlled-torque threaded fastener comprising:
   (a) a shaft having a threaded portion dimensioned and configured to threadably engage a complementary threaded bore;
   (b) a torque transmission means mounted on the shaft for rotation therewith;
   (c) a tool seat carried on the shaft and dimensioned and configured to be engaged by a driving tool for rotating the tool seat, the tool seat being movable between (i) a driving position in which it is in driving engagement with the torque transmission means and, thereby, with the shaft, and (ii) a non-driving position in which the tool seat is out of driving engagement with the torque transmission means and, thereby, with the shaft; and
   (d) biasing means carried on the fastener and positioned to exert a pre-determined biasing force on the tool seat to urge the tool seat into its driving position in opposition to driving torque imposed on the tool seat by the driving tool whereby, upon imposition upon the tool seat of a driving torque which exceeds the biasing force, the biasing force is overcome and the imposed driving torque forces the tool seat into its non-driving position to terminate driving of the shaft by the driving tool,
   the tool seat comprising a driving nut having a driving face, the torque transmission means comprising a driven collar having a driven face, and the driving face and driven face each being dimensioned and configured to be in driving engagement with each other when the tool seat is in its driving position,
   the threaded portion of the shaft having an entry end and an end opposite the entry end, and the shaft carrying a stop collar on the end of the threaded portion opposite the entry end, the biasing means being disposed adjacent to the stop collar and the driving nut being disposed between the stop collar and the driven collar.

14. A controlled-torque threaded fastener comprising:
   (a) a shaft having a threaded portion dimensioned and configured to threadably engage a complementary threaded bore;
   (b) a torque transmission means mounted on the shaft for rotation therewith;
   (c) a tool seat carried on the shaft and dimensioned and configured to be engaged by a driving tool for rotating the tool seat, the tool seat being movable between (i) a driving position in which it is in driving engagement with the torque transmission means and, thereby, with the shaft, and (ii) a non-driving position in which the tool seat is out of driving engagement with the torque transmission means and, thereby, with the shaft; and
   (d) biasing means carried on the fastener and positioned to exert a pre-determined biasing force on the tool seat to urge the tool seat into its driving position in opposition to driving torque imposed on the tool seat by the driving tool whereby, upon imposition upon the tool seat of a driving torque which exceeds the biasing force, the biasing force is overcome and the imposed driving torque forces the tool seat into its non-driving position to terminate driving of the shaft by the driving tool,
   the tool seat comprising a driving nut having a driving face, the torque transmission means comprising a driven collar having a driven face, and the driving face and driven face each being dimensioned and configured to be in driving engagement with each other when the tool seat is in its driving position,
   the threaded portion of the shaft having an entry end and an end opposite the entry end, and the biasing means comprising outwardly flared spring members disposed on the shaft adjacent the end of the threaded portion opposite the entry end, and the driving nut being disposed between the biasing means and the driven collar.

15. A controlled-torque threaded fastener comprising:
   (a) a shaft having a threaded portion dimensioned and configured to threadably engage a complementary threaded bore;
   (b) a tool seat carried on the shaft for receiving a driving tool;
   (c) biasing means carried on the shaft, the biasing means including a plurality of circumferentially disposed leaf spring dimensioned and configured to define said tool seat, the leaf springs being movable between (i) a driving position in which they are in driving engagement with the driving tool, and (ii) a non-driving position in which the tool seat is out of driving engagement with the driving tool, whereby the shaft is disengaged from driving engagement with the driving tool, wherein the biasing means exerts a predetermined biasing force on the tool seat to urge the tool seat into its driving position in opposition to driving torque imposed on the tool seat by the driving tool whereby, upon imposition upon the tool seat of a driving torque which exceeds the biasing force, the biasing force is overcome and the imposed driving torque forces the tool seat into its non-driving position to terminate driving of the shaft by the driving tool.

* * * * *